Patented Oct. 12, 1943

2,331,681

UNITED STATES PATENT OFFICE 2,331,681

PREPARATION OF CHLOROACETONITRILE

Ingenuin Hechenbleikner, Stamford, Conn., assignor to American Cyanamid Company, New York, N. Y., a corporation of Maine No Drawing. Application March 22, 1941,
Serial No. 384,706

6 Claims. (Cl. 260—464)

The present invention relates to the preparation of chloroacetonitrile by reacting glycolonitrile with an acid chloride chosen from the group consisting of thionyl chloride, phosphorous trichloride, phosphorous oxychloride and phosphorous pentachloride. The prior art describes the dehydration of chloracetamide with phosphorous pentachloride to obtain a mixture of phosphorous oxychloride and chloroacetonitrile. The mixed reaction product could not be separated by distillation owing to the small difference in their boiling points.

The present invention, therefore, has as its principal object, the preparation of chloroacetonitrile by a simple method not complicated in the recovery process, in good yields and of good purity.

Chloroacetonitrile has been found to have interesting properties as a fumigant for various species of insects. Its low toxicity to higher animals and its lachrimatory properties make it of value as a house fumigant since it serves as its own warning gas. Replacement of the hydroxyl radical in glycolonitrile by acid chlorides liberates HCl. While escape of this by-product tends to lower the overall yield, the yield may be materially increased in such a process if the reaction is carried out in the presence of a weak base. A weak organic base is preferred, pyridine, quinoline and dimethyl aniline being among those found most satisfactory. Such materials have the effect of preventing the escape of HCl, thus tending to increase the effective chlorination reaction.

Chloroacetonitrile of almost 100% purity can thus be prepared in from 75 to 85% yields by reaction between glycolonitrile and thionyl chloride in the presence of pyridine, dimethyl aniline or quinoline and a suitable solvent. No difficulties are encountered in separating the product from the reaction mixture.

*Example I*

57 grams (1 mol) of glycolonitrile was added to 177 grams (1.5 mol) of thionyl chloride in a flask fitted with a reflux condenser at such a rate that the mixture refluxed mildly without external heating. 23 grams of ethyl alcohol was then added to react with the excess thionyl chloride. Upon completion of the reaction, the chloroacetonitrile was distilled from the flask at 100 mm. pressure. While the yield was only about 33%, yet the product was of exceptional purity.

*Example II*

114 grams (2 mols) of glycolonitrile was added to 153 grams (1 mol) of phosphorous oxychloride in a three-neck flask fitted with a stirrer, condenser and dropping funnel. The nitrile was added at a rate sufficient to keep the liquid refluxing gently. After all the nitrile was in, the stirrer was replaced by a distilling head and the mixture heated to 150° C. at 20 mm. pressure. A 20% yield of good quality chloroacetonitrile was obtained.

*Example III*

57 grams (1 mol) of glycolonitrile was added to 68 grams (0.5 mol) of phosphorous trichloride contained in 100 cc. of nitrobenzene as a solvent, using the apparatus described in the above example. The nitrile was added at such a rate as to maintain a gentle reflux. HCl was liberated and the mixture gradually turned dark. After all of the nitrile had been added, the mix was heated to 120° C. at from 100 to 20 mm. pressure. A 20% yield of pure chloroacetonitrile was obtained.

*Example IV*

57 grams (1 mol) of glycolonitrile was mixed with 150 cc. of anhydrous ether as a solvent and 75 grams (1 mol) of pyridine in a one liter flask fitted with a mercury seal stirrer, a dropping funnel, a condenser and thermometer. The flask was cooled externally by an ice bath. Half of the thionyl chloride was added to the mixture at from 10 to 15° C. Pyridine hydrochloride began to separate as colorless crystals during the first part of the reaction but toward the end, a second liquid phase appeared and the solid disappeared. This lower phase probably consisted of a mixture of pyridine hydrochloride and dicyanomethyl sulfite. The second half of the thionyl chloride was added at room temperature. The temperature of the mass rose quickly to 35° C. with vigorous evolution of $SO_2$. The mixture was then refluxed for two hours on a steam bath at the end of which time the solution was poured into ice water. The liquid which separated was dried over sodium sulfate and fractionated. By this procedure, the yield of chloroacetonitrile was increased to 75%.

*Example V*

The apparatus used here was identical to that used in Example IV. 57 grams (1 mol) of glycolonitrile was mixed with 50 cc. of benzene as a solvent and 121 grams (1 mol) of dimethyl aniline. A total of 119 grams (1 mol) of thionyl chloride was added. One half of this quantity of the acid chloride was added slowly while the reaction vessel was cooled with an ice bath. The second half was then added rapidly since this part of the reaction was not exothermic. The solution remained homogeneous throughout the reaction. After all the thionyl chloride had been added, the mixture was heated at 60° C. until $SO_2$ no longer came over and the contents of the flask then refluxed for two hours on a steam bath and poured into ice water. The liquid which separated was dried over sodium sulfate and fractionated. 60% of the theoretical quantity of chloroacetonitrile was recovered.

*Example VI*

The procedure followed here was identical with that in Example V except that 129 grams (1 mol) of quinoline was used to replace the dimethyl aniline. The solution remained homogeneous during the whole reaction. After all the thionyl chloride had been added, the flask was fitted for distillation. The mixture was heated slowly to 100° C. until sulfur dioxide no longer came off and most of the benzene had distilled over. The flask was then gradually evacuated, until the pressure had reached 25 mm. The temperature was held at 100° C. until chloroacetonitrile no longer distilled. The benzene was fractionated from the chloroacetonitrile in the receiver. The yield was 73% of the theoretical.

*Example VII*

The procedure followed here was substantially that used in the preceding experiment except that a pressure-type packed stirrer was used instead of a mercury seal. The reactants consisted of 420 grams (13 mols) of glycolonitrile, 1575 grams (13 mols) of dimethyl aniline, 1550 grams (13 mols) of thionyl chloride and 650 cc. of benzene as a solvent. The mixture was stirred during the distillation. The yield was 830 grams of chloroacetonitrile or 85% of the theoretical.

Thus chloroacetonitrile may be prepared through the dehydration of glycolonitrile using acid chlorides in workable yields, although such yields may be materially increased where an organic base is used during the reaction. In all cases, the chloroacetonitrile recovered was from 99 to 100% pure.

While the invention has been described with particular reference to specific embodiments, it is to be understood that it is not to be limited thereto but is to be construed broadly and restricted solely by the scope of the appended claims.

I claim:

1. A method of making chloroacetonitrile which comprises treating glycolonitrile in the presence of an organic base with an acid chloride chosen from the group consisting of thionyl chloride, phosphorous trichloride, phosphorous pentachloride, and phosphorous oxychloride and recovering the chloroacetonitrile from the reaction product.

2. A method of making chloroacetonitrile which comprises treating glycolonitrile in the presence of dimethylaniline with an acid chloride chosen from the group consisting of thionyl chloride, phosphorous trichloride, phosphorous pentachloride, and phosphorous oxychloride and recovering the chloroacetonitrile from the reaction product.

3. A method of making chloroacetonitrile which comprises treating glycolonitrile in the presence of pyridine with an acid chloride chosen from the group consisting of thionyl chloride, phosphorous trichloride, phosphorous pentachloride, and phosphorous oxychloride and recovering the chloroacetonitrile from the reaction product.

4. A method of making chloroacetonitrile which comprises treating glycolonitrile in the presence of quinoline with an acid chloride chosen from the group consisting of thionyl chloride, phosphorous trichloride, phosphorous pentachloride, and phosphorous oxychloride and recovering the chloroacetonitrile from the reaction product.

5. A method of making chloroacetonitrile which comprises treating glycolonitrile with thionyl chloride in the presence of an organic base and recovering the chloroacetonitrile from the reaction product.

6. A method of making chloroacetonitrile which comprises treating glycolonitrile with thionyl chloride in an organic solvent in the presence of an organic base and recovering the chloroacetonitrile from the reaction product.

INGENUIN HECHENBLEIKNER.